US008037437B2

(12) United States Patent
Davis et al.

(10) Patent No.: US 8,037,437 B2
(45) Date of Patent: Oct. 11, 2011

(54) OPTIMIZING SYSTEMS-ON-A-CHIP USING THE DYNAMIC CRITICAL PATH

(75) Inventors: John D. Davis, San Francisco, CA (US); Mihai Budiu, Sunnyvale, CA (US); Hari Kannan, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 12/353,168

(22) Filed: Jan. 13, 2009

(65) Prior Publication Data

US 2010/0180240 A1      Jul. 15, 2010

(51) Int. Cl.
*G06F 9/455* (2006.01)
(52) U.S. Cl. .................... 716/113; 716/108; 716/134
(58) Field of Classification Search .................. 716/113
See application file for complete search history.

(56) References Cited

U.S. PATENT DOCUMENTS

| | | | |
|---|---|---|---|
| 5,006,980 | A | 4/1991 | Sanders |
| 5,819,072 | A | 10/1998 | Bushard |
| 6,102,961 | A | 8/2000 | Lee |
| 6,324,678 | B1 | 11/2001 | Dangelo |
| 6,536,028 | B1 | 3/2003 | Katsioulas |
| 6,757,877 | B2 | 6/2004 | Stenberg |
| 7,191,417 | B1 | 3/2007 | Luo |
| 7,231,336 | B2 | 6/2007 | Wei |
| 7,240,303 | B1 | 7/2007 | Schubert |
| 7,308,593 | B2 | 12/2007 | Jacobson |
| 2005/0273110 | A1 | 12/2005 | Boehm |

OTHER PUBLICATIONS

Barford, "Critical Path Analysis of TCP Transactions," In the Proceedings of the 2000 ACM SIGCOMM Conference, Sep. 2000.
Borch, "Loose Loops Sink Chips," Proc. Eighth International Symposium on High-Performance Computer Architecture, Feb. 2-6, 2002.
Burns, "Performance Analysis and Optimization of Asynchronous Circuits," Computer Science Dept., California Institute of Technology, 1990.
Davis, "Maximizing CMP Throughput with Mediocre Cores," 14th International Conference on Parallel Architectures and Compilation Techniques, Sep. 17-21, 2005.
Davis, "The RASE (Rapid, Accurate Simulation Environment) for Chip Multiprocessors," ACM SIGARCH Computer Architecture News, vol. 33, Issue 4, Nov. 2005.
Eeckelaert, "Efficient Multiobjective Synthesis of Analog Circuits using Hierarchical Pareto-optimal Performance Hypersurfaces," Proceedings of the Design, Automation and Test in Europe Conference and Exhibition, 2005.

(Continued)

*Primary Examiner* — Jack Chiang
*Assistant Examiner* — Bryce Aisaka
(74) *Attorney, Agent, or Firm* — Vierra Magen Marcus & DeNiro LLP

(57) ABSTRACT

The Global Dynamic Critical Path is used to optimize the design of a system-on-a-chip (SoC), where hardware modules are in different clock domains. Control signal transitions of the hardware modules are analyzed to identify the Global Dynamic Critical Path. Rules are provided for handling specific situations such as when concurrent input control signals are received by a hardware module. A configuration of the hardware modules is modified in successive iterations to converge at an optimum design, based on a cost function. The cost function can account for processing time as well as other metrics, such as power consumed. For example, during the iterations, hardware modules which are in the Global Dynamic Critical Path can have their clock speed increased and/or additional resources can be added, while hardware modules which are not in the Global Dynamic Critical Path can have their clock speed decreased and/or unnecessary resources can be removed.

20 Claims, 10 Drawing Sheets

OTHER PUBLICATIONS

Fields, "Focusing Processor Policies via Critical-Path Prediction," Computer Sciences Department, University of Wisconsin-Madison, 28th Annual International Symposium on Computer Architecture, Jul. 2001.

Gielen, "Computer-Aided Design of Analog and Mixed-Signal Integrated Circuits," Proceedings of the IEEE, vol. 88, No. 12, Dec. 2000.

LEON3 Multiprocessing CPU Core, Aeroflex Gaisler AB, Sweden, Sep. 2008.

Nagarajan, "Critical Path Analysis of the TRIPS Architecture," Symposium on Performance Analysis of Systems and Software, 2006.

Dalton, "Raksha: A Flexible Information Flow Architecture for Software Security," ISCA '07, San Diego, California, Jun. 9-13, 2007.

Saidi, "Full-System Critical Path Analysis," IEEE International Symposium on Performance Analysis of Systems and Software, Apr. 20-22, 2008.

Venkataramani, "Global Critical Path: A Tool for System-Level Timing Analysis," Design Automation Conference, San Diego, California, Jun. 4-8, 2007.

Xie, "Bounding Average Time Separations of Events in Stochastic Timed Petri Nets with Choice," Proc. Of the 5th Int. Symp. on Advanced Research in Asynchronous Circuits and Systems, Barcelona, Spain, Apr. 1999.

Kwok, "Dynamic Critical-Path Scheduling: An Effective Technique for Allocating Task Graphs to Multiprocessors," IEEE Transactions on Parallel and Distributed Systems, vol. 7, No. 5, May 1996.

Venkataramani, "Modeling the Global Critical Path in Concurrent Systems," Proc. of the 44th Annual ACM IEEE Design Automation Conference, 2007.

OPTIMIZING SYSTEMS-ON-A-CHIP USING THE DYNAMIC CRITICAL PATH

BACKGROUND

A system-on-a-chip (SoC) integrates all components of a computer or other electronic system into a single integrated circuit or chip. It may contain digital, analog, mixed-signal, and often radio-frequency functions. A typical SoC can include a microcontroller, microprocessor or digital signal processor (DSP) cores. Some SoCs, referred to as multiprocessor System-on-Chip (MPSoC), include more than one processor core. Other components include memory blocks such as ROM, RAM, EEPROM and Flash, timing sources including oscillators and phase-locked loops, peripherals including counter-timers, real-time timers and power-on reset generators, external interfaces including industry standards such as USB, FireWire, Ethernet, USART, SPI, analog interfaces such as analog-to-digital converters (ADCs) and digital-to-analog converters (DACs), and voltage regulators and power management circuits.

These components are connected by either a proprietary or industry-standard bus such as the Advanced Microcontroller Bus Architecture (AMBA) bus, or by DMA controllers which route data directly between external interfaces and memory, bypassing the processor core and thereby increasing the data throughput of the SoC. Example applications for SoC include music players and video game consoles, among many other possible applications.

Moreover, silicon process technology scaling has enabled very high degrees of integration resulting in complex SoC designs, spanning designs from complex chip multi-processors to highly integrated embedded systems. The SoC building blocks—referred to as Intellectual Property (IP) blocks—used by a manufacturer may come from a variety of internal and external sources. Regardless of the SoC IP block source, the internal operation of modules and associated corner cases may not be well understood or transparent to the SoC designers. Furthermore, with the high degree of integration among IP blocks, and with the increasing amount of concurrent execution, understanding the interactions between various modules or blocks has become very difficult. SoC designers are often forced to make educated guesses about the way the different modules impact each other's performance. This is further complicated by third party vendors of IP blocks that do not provide source code access for their modules. All of these factors make performance analysis of SoCs extremely difficult.

Improved techniques are need for optimizing SoC designs.

SUMMARY

Techniques for optimizing SoC designs using the dynamic critical path are presented.

In one aspect, a computer-implemented method for optimizing a SoC design includes determining a global critical path of the SoC design for an initial configuration of multiple hardware modules of the SoC design. The multiple hardware modules include respective hardware modules which are synchronous in respective different clock domains and asynchronous with respect to one another, and a subset of the multiple hardware modules are identified as being in the global critical path. Determining the global critical path comprises tracking transitions of control signals, which are input to and output from each of the multiple hardware modules, determining dependencies between the control signals, and determining a processing time of each of the multiple hardware modules. The method further includes modifying a configuration of the hardware modules in each of one or more successive iterations, and determining a cost function for each modified configuration, where the cost function is based on a processing time of each hardware module, determining which of the modified configurations is optimal based on the cost functions, and providing a report which identifies the optimal configuration.

In another aspect, a computer-implemented method for optimizing a SoC design includes determining a global critical path of multiple hardware modules of the SoC design, where the multiple hardware modules include respective hardware modules which are synchronous in respective different clock domains and asynchronous with respect to one another, and a subset of the multiple hardware modules are identified as being in the global critical path. Determining the global critical path comprises tracking transitions of control signals, which are input to and output from each of the multiple hardware modules, and determining dependencies between the control signals. Further, at least one of the hardware modules outputs an acknowledgement control signal to another hardware module in response to receipt of an input control signal from the another hardware module, where the at least one of the hardware modules and the another of the hardware module are in different stages of a pipelined process in a common clock domain, and the tracking includes tracking transitions of the acknowledgement control signal. The method further includes determining a processing time of each hardware module based on the tracking, determining a cost function based on the processing time, determining an optimal configuration for each hardware module based on the cost function, and providing a report which identifies the optimal configuration.

In another aspect, a computer readable media has computer readable software embodied thereon for programming at least one processor to perform a method. The method includes determining a global critical path of a SoC design, where the SoC design has respective hardware modules which are synchronous in respective clock domains and are asynchronous with respect to one another, a first subset of the multiple hardware modules are identified as being in the global critical path, and a remainder of the multiple hardware modules are not in the global critical path. Determining the global critical path comprises tracking transitions of control signals, which are input to and output from each hardware module, determining dependencies between the control signals, and determining a processing time of each hardware module. The method further includes determining a cost function based on the processing time of each hardware module, determining an optimal configuration for the SoC design by determining a configuration of the hardware modules which optimizes the cost function, and providing a report which identifies the optimal configuration.

This summary is provided to introduce a selection of concepts in a simplified form that are further described below in the description. This summary is not intended to identify key features or essential features of the claimed subject matter, nor is it intended to be used to limit the scope of the claimed subject matter.

DETAILED DESCRIPTION

Figure 1:
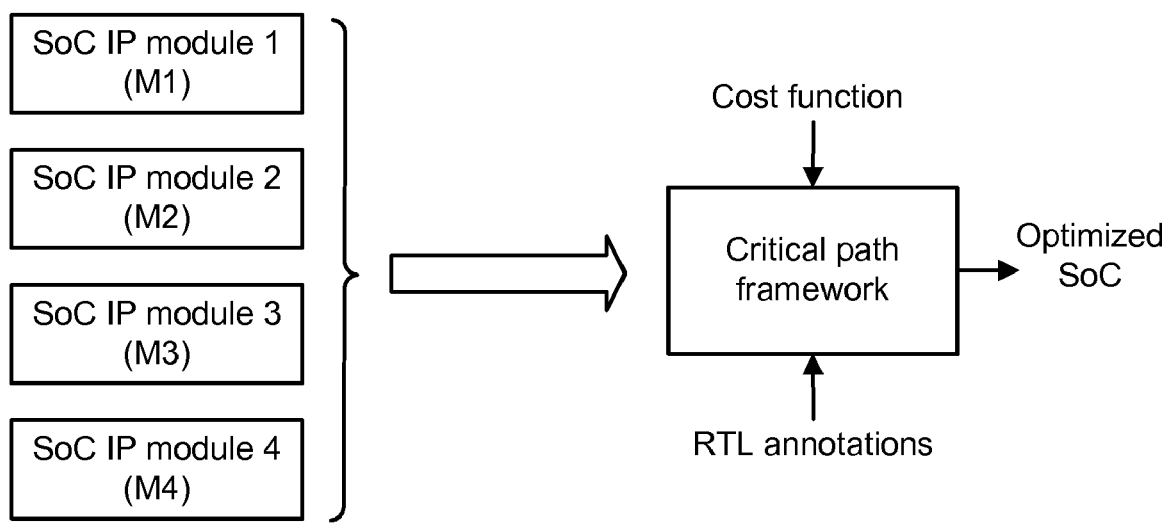
FIG. 1 depicts an overview of a process for using a critical path framework to optimize a SoC.

Techniques for optimizing SoC designs using the dynamic critical path are presented.

The Global Dynamic Critical Path is used to optimize the design of a SoC, where hardware modules can be in different clock domains and are presented in the example with different clock domains to demonstrate the system flexibility. Control signal transitions of the hardware modules are analyzed to identify the Global Dynamic Critical Path and rules are provided for handling specific situations such as when concurrent input control signals are received by a hardware module. Moreover, a configuration of the hardware modules can be modified in successive iterations to converge at an optimum design, as defined by a cost function.

In particular, we use the Global Dynamic Critical Path to diagnose system-wide bottlenecks using representative benchmarks to direct embedded SoC optimizations and provide real-world experience of implementing the global critical path (GCP) analysis framework on a Globally-Asynchronous Locally-Synchronous (GALS) SoC built around the LEON3 CPU. The LEON3 CPU is a 32-bit synthesizable processor core based on the SPARC V8 architecture, and available from Aeroflex Gaisler AB, Goteborg, Sweden. We perform our analysis at the register transfer language (RTL) level and extend our evaluation to abstract RTL models. We use the power-delay product as the example cost function for optimization; we can adjust the power-delay by tuning the frequency of the clock domains of each SoC IP block. We show that the GCP optimization framework can accommodate other cost functions as well, while effectively directing SoC optimization efforts. Our case studies demonstrate that the GCP algorithm can converge quickly to solutions even in the very large (exponential) search spaces describing permissible SoC configurations, with no designer intervention (for instance, we find the solution of a 6-dimensional space with 19000 configurations in 11 steps). Even though our initial implementation relies on manual source code instrumentation, we only add 1% extra lines of code to the design. This represents annotating less than 0.2% of the ports of the overall Multi-processor SoC design.

Recent work has established dynamic critical path (or global critical path, GCP) analysis as a powerful tool for understanding and optimizing the dynamic performance profile of highly concurrent hardware/software systems. For example, see B. Fields, S. Rubin et al., "Focusing processor policies via critical-path prediction," Proc. ISCA, June 2001 and G. Venkataramani, M. Budiu et al., "Critical Path: A Tool for System-Level Timing Analysis," Proc. DAC, June 2007, both incorporated herein by reference. The GCP provides valuable insight into the control-path behavior of complete systems, and helps identify bottlenecks. The GCP tracks the chaining of transitions of the key control signals and identifies the modules or IP blocks that contribute significantly to the end-to-end computation delay.

Generally, the critical path identifies the sequence of hardware modules which must perform a task such as processing a signal, or, more generally, any computational task operating on digital data, where this sequence represents the longest duration path in the SoC. Any delay on the critical path directly impacts the overall processing time. On the other hand, a further delay on a non-critical path typically does not impact the overall processing time. Thus, it may be acceptable to use slower, lower performing components on the non-critical paths. A SoC design can have several, parallel, processing paths other than the critical path.

The GCP can be used to identify and remove system-wide bottlenecks in multiple processor systems-on-a-chip (MP-SoCs). Using this knowledge, designers can better direct their optimizations: to boost the performance of underperforming modules, lower power consumption, reduce excessive resources, etc. In the absence of such a tool, designers are often forced to simulate many combinations of the various configurations, in order to arrive at an optimal design. The overall system architecture that we propose is depicted in FIG. 1.

FIG. 1 depicts an overview of a process for using a critical path framework to optimize a SoC. The process includes a number of SoC IP modules, examples of which are M1, M2, M3 and M4, which are analyzed by a critical path framework. The critical path framework receives additional inputs such as a cost function and RTL annotations. An output of the critical path framework can be a report which provides the parameters of an optimized SoC. The report can be in the form of a data structure which is stored in a file, a display on a user interface screen and/or a hardcopy print out, for instance.

RTL simulation is commonly used in conjunction with software simulation to verify and validate large system designs, and for initial software development. For further information, see, e.g., J. D. Davis, C. Fu, and J. Laudon, "The RASE (Rapid, Accurate Simulation Environment) for Chip Multiprocessors," Appears in Computer Architecture News, Vol. 33, November 2005, incorporated herein by reference. We start our investigation of the GCP analysis at the RTL level, which provides a completely accurate system evaluation or ground truth. We also investigate the impact of reduced simulation fidelity, by approximating RTL modules with black-boxes, and we evaluate the impact of the approximations on the accuracy of the GCP computation. We note that the GCP can be used at higher abstraction levels (e.g. software simulation, network protocols), and quantify the errors introduced by using approximations. If these errors are small, the use of approximate models (which can be simulated much faster) is justified.

Alternative SoC optimization techniques based on numerical design optimization, such as simulated annealing, or evolutionary algorithms require significant simulation time, especially for large designs. This problem is exacerbated by the lack of intuition related to unfamiliar or misunderstood IP blocks, and by the extremely large search space, exponential in the number of IP blocks. Knowledge of the GCP allows designers to perform a directed search, and to reach optimal configurations quickly, significantly speeding up development time. The GCP framework can be used in conjunction with a variety of cost functions to guide the SoC optimization.

The GCP framework is ideal for SoC and MPSoC designs because such systems tend to be designed for a narrow range of applications. As a result, the software running on these systems is well defined and not general purpose. The dynamic critical path analysis is only effective if the benchmarks or applications used to drive the GCP framework are representative of the actual workload.

We evaluate the effectiveness of the GCP technique using a system based on the open-source LEON3 SoC design, as an example. We have modified the RTL of this design to log control signal transitions, which are used to compute the GCP. Additionally, we have added different modules (in separate clock domains) to the SoC design in order to emulate a more complex SoC composed from a variety of IP blocks.

Our experiments show that the GCP provides good feedback to designers by correctly identifying system-wide bottlenecks. Because we apply the critical path analysis to the RTL design, we have the flexibility of examining the critical path at a variety of levels: within the modules, at the module interfaces, or higher. Some designers operate on abstracted views of the design such as electronic-system-level (ESL) models, or transaction-level models. These designs, however, are written concurrently with the actual hardware specification, and are not derived from the underlying RTL. Divergence from the actual design and the imperfect modeling of critical transitions can decrease the fidelity of the results computed using these other techniques that utilize higher abstraction levels.

Using the GCP also helps the designers to efficiently explore the search space for configuration parameters, arriving at optimal or near-optimal configurations much faster than exhaustive searches. We have verified optimality on small designs by exhaustive simulation; optimality cannot be ascertained for designs with very large configuration spaces, since a search for the optimum is intractable. Using a power-delay product as the exemplar cost function, our algorithm efficiently discovers the optimal combination of parameters for the IP blocks (e.g., hardware modules) that constitute the SoC design.

Specifically, we advocate the use of the GCP as a tool to guide designers and direct their optimizations to remove system level bottlenecks. We prove the utility of the GCP for automatically directing optimizations to find optimal SoC configurations (our search of 19,200 configurations converges in at most 11 steps).

We discuss how the GCP can be used to guide the parameter space search for various cost functions; these functions incorporate trade-offs between circuit performance and other resources (power, area, design complexity, etc.).

We share real-world experience of incorporating the GCP at the RTL level in a SoC framework consisting of both blocking and non-blocking modules, interacting concurrently.

We use a bottom-up approach and investigate the trade-off between increasing the level of abstraction and GCP accuracy. We develop the use of GCP for a mixed-IP block design approach that incorporates both fully defined IP blocks and black boxes (IP blocks without source code).

GCP is used at the RTL level for an entire SoC design that includes synchronous hardware components in multiple clock domains.

Below, we provide a background on GCP and discuss related work, we discuss specific issues when implementing the GCP tool for an SoC, we provide details about our evaluation system and we provide the evaluation.

A formal definition of the Critical Path in operations research is "the longest path in a weighted acyclic graph." An informal notion of critical path has been used for a long time at various levels of system views, including asynchronous circuits, modeled as Petri nets and synchronous circuits, as well as software modules, network protocols and multi-tier web services. A formal definition of the critical path can be found in the above-mentioned G. Venkataramani, M. Budiu et al., "Critical Path: A Tool for System-Level Timing Analysis", Proc. DAC, June 2007. The critical path is also related to critical cycles in pipelined processors.

The GCP should not be confused with the traditional notion of static critical path in synchronous circuits, which is defined to be the longest of the possible signal propagation delays between two clocked latches. The dynamic GCP is more related to the concept of instructions per cycle (IPC) for processors, since it is dependent on a particular workload (that is why the path is called "dynamic").

Figure 2:
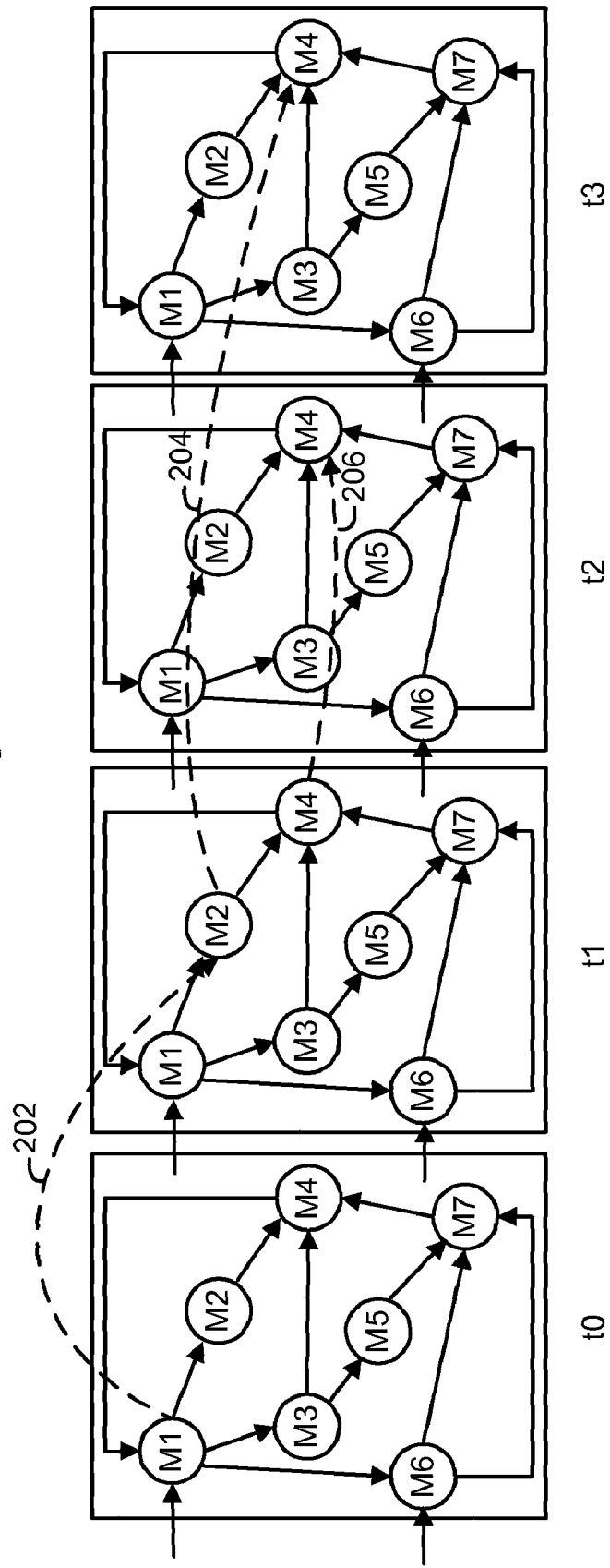
FIG. 2 depicts a global critical path, which is the longest chain of events in a timed graph.

FIG. 2 depicts a global critical path, which is the longest chain of events in a timed graph. The timed graph depicts four example time points: t0, t1, t2 and t3. In this example, there are seven hardware modules, labeled M1 through M7, in the SoC design. Two input signals are received by the SoC, at M1 and M6. The modules provide control signals to one another as indicated by the arrows. For example, M1 provides control signals to M2 and M3.

Modeling a hardware circuit as a graph, the nodes in the graph are functional units (hardware modules M1 through M7) and the edges are signals. To define the GCP, we have to consider an execution of the circuit, for a particular input; then we "unroll" the execution of the circuit. The unrolled circuit (called a timed graph) contains a replica of the entire circuit for each relevant time moment. The edges of the timed graph are signal transitions (not the signals themselves). As an example, an edge between (M1, t0) and (M2, t1) (arrow 202) represents a signal leaving M1 at time t0 as an output control signal and reaching M2 at time t1 as an input control signal. Similarly, an edge between (M2, t1) and (M4, t3) (arrow 204) represents a signal leaving M2 at time t1 and reaching M4 at time t3. Edges from a module to itself such as (M4, t1) to (M4, t2) (arrow 206) represent computation delay. The timed graph is an acyclic graph (for all edges, the end time is larger than the start time); the longest chain of events in the timed graph is the GCP. Normally only control signals need to be considered as parts of the GCP, because data signal transitions do not influence the timing of outputs.

GCP can be readily computed for asynchronous circuits because all signal transitions are explicit. However, applying GCP to synchronous circuits presents many challenges that we address. In particular, we discuss how GCP can be applied in practice for analyzing SoC designs with the added complexity of multiple clock domains.

Figure 3:
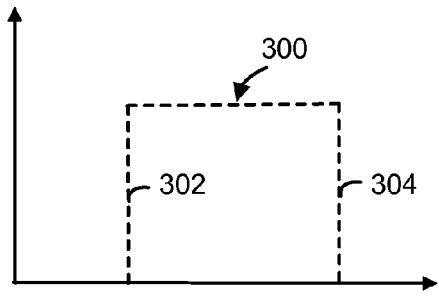
FIG. 3 depicts control signal transitions.
Figure 6:
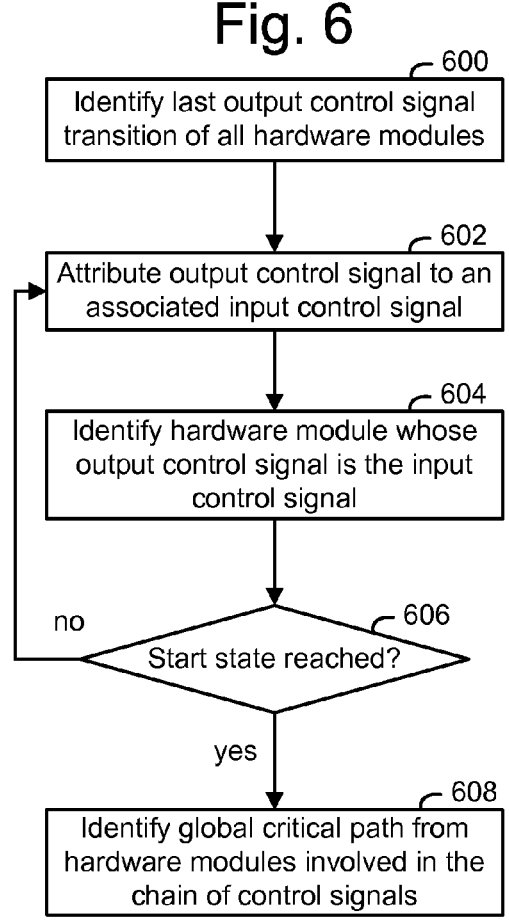
FIG. 6 depicts a process for determining a global critical path in a SoC design.

Computing the GCP over all the modules can be achieved by tracking dependencies between control signals. This involves attributing an output control signal of a hardware module to an input control signal of the module. One possible approach for computing the GCP relies on an algorithm proposed in the above-mentioned B. Fields, S. Rubin et al., "Focusing processor policies via critical-path prediction," Proc. ISCA, June 2001. For each module, we track the input and dependent output transitions. Whenever an output signal makes a transition (i.e., the module produces a new output value), we must be able to attribute it to a previous input transition, which triggered the computation. For example, FIG. 3 depicts control signal transitions in a control signal 300, including an increasing transition 302 and a decreasing transition 304. In one approach, we only consider the last arrival input that caused this output (an output may depend on multiple inputs). Even if we track these dependencies at runtime for each module in isolation, we can construct the GCP by stitching together the local transitions, starting with the last transition of the system, and going back to the last arrival input which caused that transition. Recursively, this last arrival input becomes the last transition, and the algorithm is repeated until the start state is reached. This chain of edges is the GCP. This algorithm is illustrated in FIG. 6.

The GCP is usually a large data structure, so we represent the GCP compactly as an edge histogram: for each signal of the circuit we count how many times its transition appears on the critical path. A signal with a high count is more critical than one with a low count.

Figure 4:
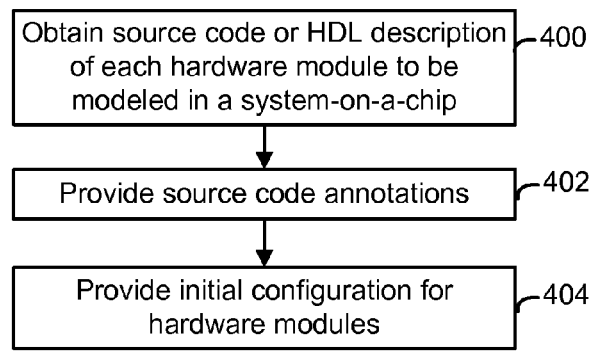
FIG. 4 depicts a setup process for optimizing a SoC design.

The computation and use of the global critical path can be understood further in view of the following. FIG. 4 depicts a setup process for optimizing a SoC design. Step 400 includes obtaining source code or a hardware description language (HDL) description of each hardware module which is to be modeled in a SoC design. The source code, which may be RTL, is sometimes available from the manufacturer of the hardware module. In other cases, HDL can be used to describe the operation, design and organization of an electronic circuit. If a module is treated as a black-box, we don't need its source code. However, we do need a description (in HDL) of how the various modules connect to each other. Step 402 provides source code annotations, such as annotations to RTL code, to access desired information regarding control signal transitions. The annotation essentially allows the designer to peek inside each component. The annotations can also be useful in debugging. There are some tools, called wave form analyzers, which display the signal transitions, which may obviate the need for the source code and the associated annotation code. Step 404 includes providing an initial configuration for the hardware modules. Typically, the processing speed (frequency) of each component is configured, in addition to other metrics, as discussed further below.

Figure 5:
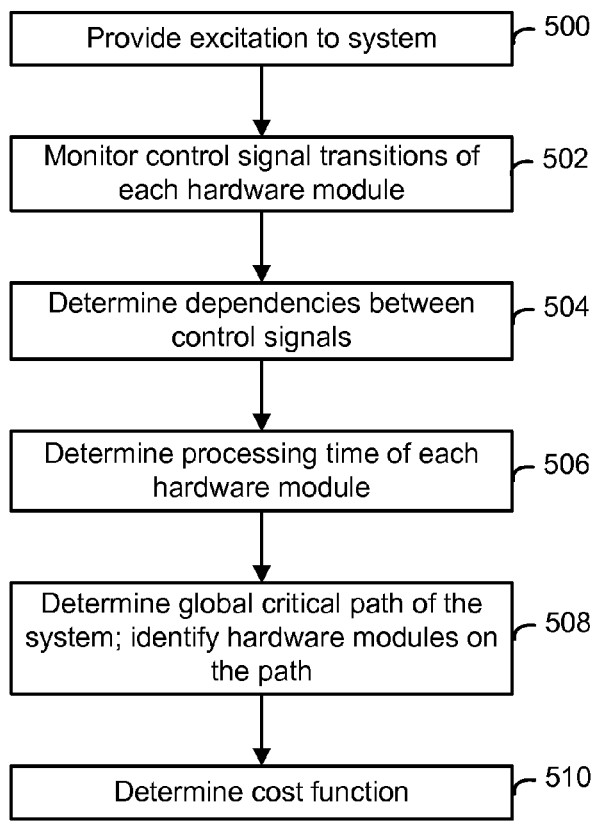
FIG. 5 depicts an initial iteration of a process for optimizing a SoC design, in which a global critical path is determined.

FIG. 5 depicts an initial iteration of a process for optimizing a SoC design, in which a global critical path is determined. The initial iteration is used to determine the global critical path of the SoC design. Step 500 includes providing one or more excitations/inputs to the system. These represent the environment of the system. Step 502 includes monitoring control signal transitions of each hardware module of interest. Note that not necessarily every hardware module of the SoC needs to be monitored. Step 504 includes determining dependencies between control signals. That is, for each output signal of a module, we determine which input control signal of the module should be identified as the cause of the output; that is, an input control signal to which an output control signal is attributed. Step 506 includes determining the processing time of each hardware module, e.g., based on a delay between an input control signal and an output control signal of a module. Step 508 includes determining the global critical path and identifying the hardware modules of the system design which are on the GCP. The remaining hardware modules are thus not on the GCP. Typically, only a subset of all hardware modules which are initially observed will be on the GCP. Other hardware modules on the system design will not be on the GCP and need not be used for optimizing the design. Further details of determining the GCP are provided in FIG. 6.

Step 510 includes determining a cost function of the SoC, which is based on cost functions for hardware modules on and off the GCP. As mentioned, one example is to use the power-delay product (power multiplied by delay, or PD) as the exemplar cost function. This represents a product of the power consumed by a hardware module and the processing delay incurred by the hardware module, summed over all hardware modules involved. Many alternative cost functions besides the power-delay product may be used. Generally, the cost function can be based on processing time (delay), a combination of delay and another metric, or something other than delay. Moreover, the cost function could be based on one metric or multiple metrics.

Note that the steps of FIG. 5 and other flow charts herein are not necessarily performed as discrete steps in the order shown.

FIG. 6 depicts a process for determining a global critical path in a SoC design. Step 600 includes identifying a last output control signal transitions of all hardware modules. Step 602 includes attributing the output control signal to an associated input control signal. If there are not concurrent candidate input signals, the last input signal which most closely precedes the output control signal is selected. When there are concurrent candidate input signals, e.g., in the same clock cycle, various tie-breaking techniques can be used as discussed further below. Step 604 includes identifying a hardware module whose output control signal is the input control signal of step 602. At decision step 606, if the start state is reached (where the first computation is performed), that is, there is no further hardware module whose output control signal is an input control signal to another hardware module, step 608 includes identifying the GCP from the hardware modules which are involved in the identified chain of control signals. At decision step 606, if the start state is not reached, the process of steps 602 and 604 repeats.

FIG. 6 thus provides a technique for determining the GCP by determining dependencies between the control signals, starting at a last output control signal transition of the hardware modules, and working backward recursively to identify a chain of control signal transitions which reaches a start state, where the chain represents the global critical path. The design of the SoC can be optimized knowing that it is desired to speed up processing of the hardware modules on the GCP, and that slowing down hardware modules that are not on the GCP may be acceptable and may not increase overall system processing time.

Figure 7:
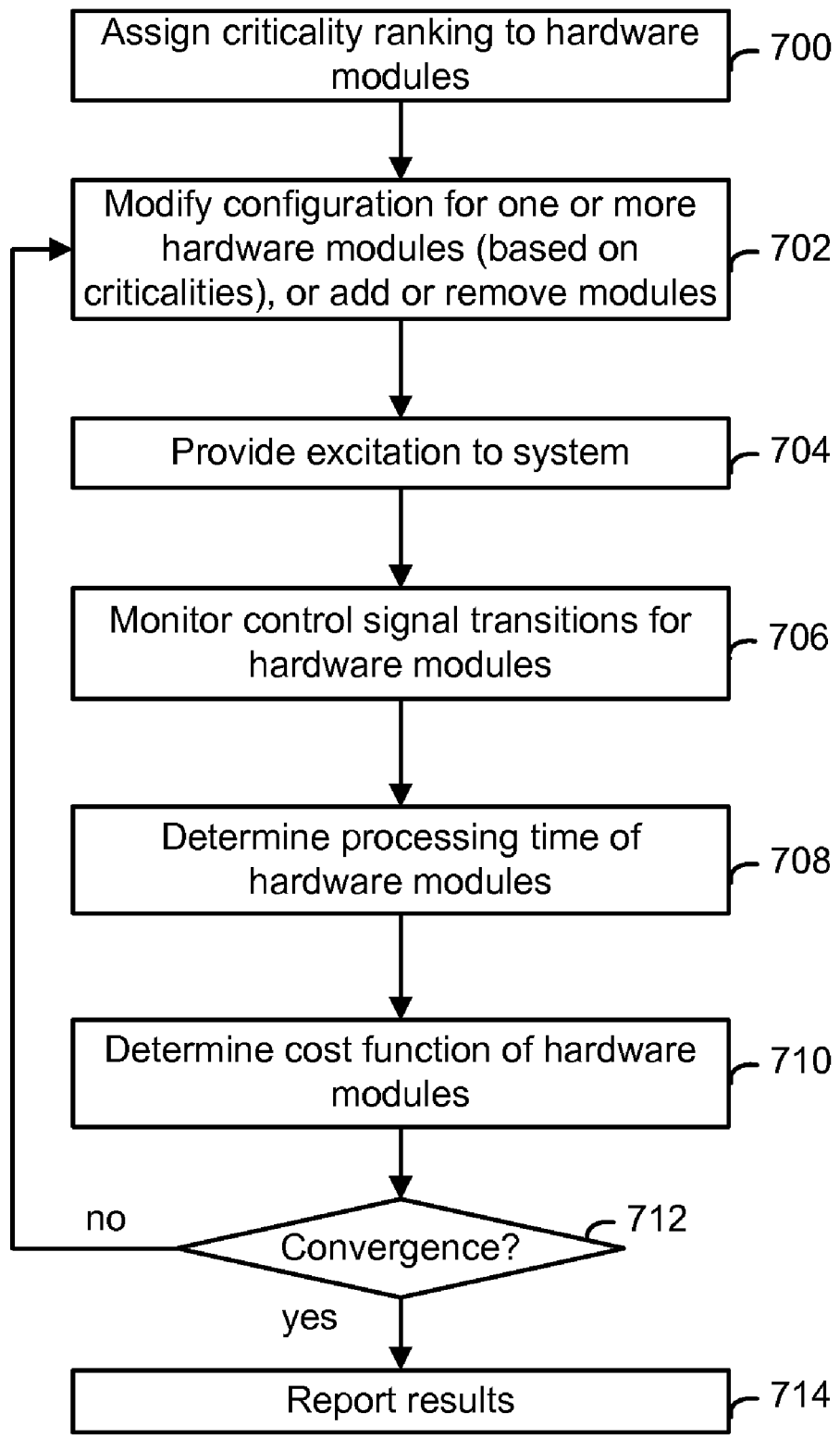
FIG. 7 depicts successive iterations of a process for optimizing a SoC design, in which the configuration of hardware components on and off the global critical path is optimized.

FIG. 7 depicts successive iterations of a process for optimizing a SoC design, in which the configuration of hardware components on and off the global critical path is optimized. As mentioned, the GCP is determined with an initial configuration assigned to the hardware modules. Subsequently, this configuration can be optimized using various techniques. In one possible approach, at step 700, criticalities are assigned to the hardware modules. For example, the designer may decide that a particular hardware module is more important than others and should therefore have a greater weight in the optimization process. In one possible approach, a component with an average criticality among a set of components may have a weight of one, while a component with a relatively high criticality may have a weight greater than 1, and a component with a relatively low criticality may have a weight less than one. For example, a particular component may be relatively expensive such that it is desired to substitute a lower performing component, if possible, during the optimization. The criticality signals that priority should be given to optimizing this particular component over other less critical components. However, assigning a criticality is optional.

Step 702 includes modifying the configuration of one or more hardware modules, or adding or removing resources such as modules or components. This is optionally based on the criticalities, if used. Otherwise, the configuration is modified based on other criteria. For example, it may be determined that an additional component can be added to the SoC design, within or outside the critical path, or that an existing component should be removed, again within or outside the critical path. For instance, we can potentially speed-up modules by other means than increasing clock speed, such as using more resources, such as caches. It is also possible to replicate modules to increase performance in some cases.

Step 704 includes providing an excitation to the system. Step 706 includes monitoring control signal transitions for the hardware modules. Step 708 includes determining a processing time of the hardware modules. Step 710 includes determining the cost function of the hardware modules. At decision step 712, if the value of the cost function converges toward a minimum, the optimization process is complete, and step 714 includes reporting the results of the optimization. At decision step 712, if the value of the cost function has not yet converged toward a minimum, step 702 is repeated to further modify the configuration.

Generally, if step 710 indicates that the cost function has increased relative to the previous iteration, the modification of step 702 in the next iteration can provide an opposite adjustment in an attempt to decrease the cost function. If the cost function was decreased relative to the previous iteration, the modification of step 702 in the next iteration can provide a further adjustment in the same direction in an attempt to further decrease the cost function.

Regarding GCP accuracy, the GCP can be computed at various levels of the system, from actual hardware to high-level simulations. We are interested in understanding the loss of fidelity that can occur by using approximate models of the hardware. The GCP computed using the lowest level of abstraction is the ground truth GCP; the GCP computed using more abstracted models is an approximation.

Given our definition of the GCP, there are three requirements for a model to produce an accurate estimate of the GCP: (1) it must model all concurrent hardware blocks, (2) for each hardware block, it must model the correct dependencies between input and output control signals, and (3) it must model transaction interleaving in the correct order (e.g., the arrival of two input signals should not be swapped).

We choose to compute the GCP at the RTL level because we regard it as the closest approximation to the actual hardware where no fidelity is lost. RTL simulation cannot account for non-determinism and is an approximation of the real hardware. The GCP can be applied at other layers of abstraction of the system such as transaction-level models (TLMs), if they accurately represent the hardware. TLMs are a higher-level abstraction used in the design of integrated circuits. Currently, however, their use is mainly in RTL validation. These models are usually not derived from the RTL specification, but are hand-written to verify the RTL. Lastly, we discuss how to build high-level models that do not lose precision in the computation of the GCP, and how to use these models for system optimization.

Applying this methodology to synchronous RTL-level circuits is not entirely straightforward. In contrast, the GCP is easy to build for handshake-based asynchronous circuits, because all signal transitions are explicit—and the critical path is composed of signal transitions. In clocked circuits, some signal transitions are implicit. Below, we detail some of the problems that we faced and the solutions we employed.

Regarding dependencies in hardware modules which are described as finite state machines (FSMs): For a complex digital system, even in the presence of full RTL description, it is not always obvious what the input—output dependencies are. When an FSM transitions to a state that outputs a signal, it is unclear which of the previous inputs caused the output. We solve this problem by tracking backwards dependencies through state transitions. If the FSM contains no $\epsilon$-transitions, or epsilon-transitions (state transitions that are not triggered by inputs), then the previous input is the cause. If there are $\epsilon$-transitions, we move backward through these transitions until we see a transition caused by an external input.

Regarding "don't cares" in control logic: Another issue is related to some control signals being computed using combinational logic; in such cases inputs that generate control signals may actually be don't cares. We ignore the "don't care" issue in our current implementation, and assume true dependences in such cases.

Figure 8:
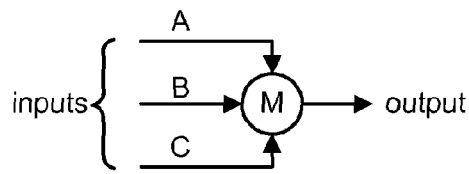
FIG. 8 depicts a hardware module which has multiple input control signals.
Figure 9:
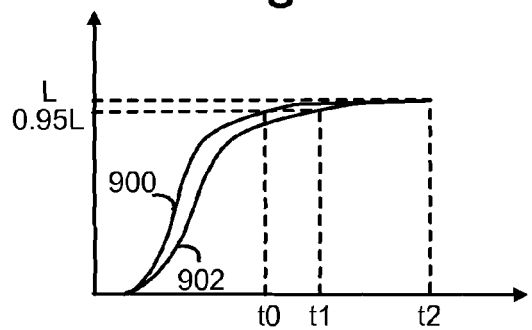
FIG. 9 depicts control signal waveforms.

Regarding concurrent events: Multiple input control signals of a single module can transition in the same cycle and multiple choices for the last arrival input are possible (this issue does not occur in asynchronous circuits). For example, FIG. 8 depicts a hardware module M, which has multiple input control signals A, B and C. If a waveform is available, the last signal to stabilize can be chosen. For example, FIG. 9 depicts control signal waveforms. A waveform 900 transitions to, e.g., 95% of a final level L at a time t0, while a waveform 902 transitions to 95% of the final level L at a time t1. In this case, waveform 902 is the last to stabilize. Simulation ties can be broken randomly, or by selecting control signals in a round-robin manner. Regarding the round-robin manner, for example, if control signals A, B and C are concurrent inputs in multiple iterations, control signal A can be chosen in one iteration, control signal B can be chosen in the next iteration, control signal C can be chosen in the next iteration, control signal A can be chosen in the next iteration, and so forth.

Regarding implicit signal transitions: In synchronous systems a signal may not change its values between two clock cycles, but it may still imply a pair of logical transitions (down and up). Consider a pair of modules using a common clock, in a producer-consumer relation, connected with a pair of signals for handshaking: ready (producer=>consumer) and stall (consumer=>producer). In normal operation, the ready signal (an input to the consumer) is set every clock cycle; this however indicates the availability of a new resource (a data item) every cycle. The stall signal is an input to the producer; as long as the stall is set, the producer cannot compute. Thus, the lack of transition on the stall indicates the absence of the same unique resource. No changes of the signal values are observed in either case, but the meanings are quite different. Designer knowledge is required to solve this problem.

Figure 10A:
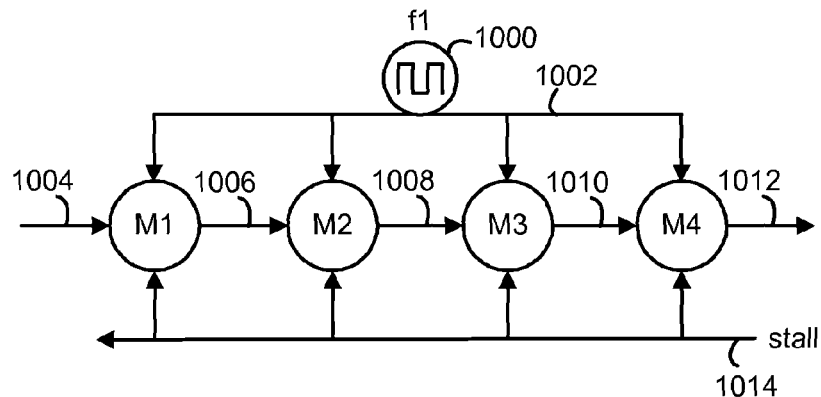
FIG. 10a depicts a synchronous pipeline with a stall signal.

Regarding asynchronous-like handshaking: Synchronous systems such as pipelined processors do not have explicit request and acknowledge signals between communicating modules. Instead, a synchronous processor pipeline usually has "stall" signals. For example, FIG. 10a depicts a synchronous pipeline with a stall signal. The pipeline includes four example modules M1 through M4, in respective stages, which receive a common clock 1000 at a frequency f1 via a path 1002. Data, e.g., instructions or results from processing instructions, is first received by M1 via a line 1004, which in turn processes the data and provides a result to M2 via a line 1006, and so forth, in a downstream direction. M2 provides data to M3 via line 1008, M3 provides data to M4 via line 1010 and M4 provides an output via line 1012, in this example. A four-stage pipeline is provided as an example only. A stall signal on line 1014 instructs a module to wait when necessary to receive data from an upstream module.

Figure 10B:
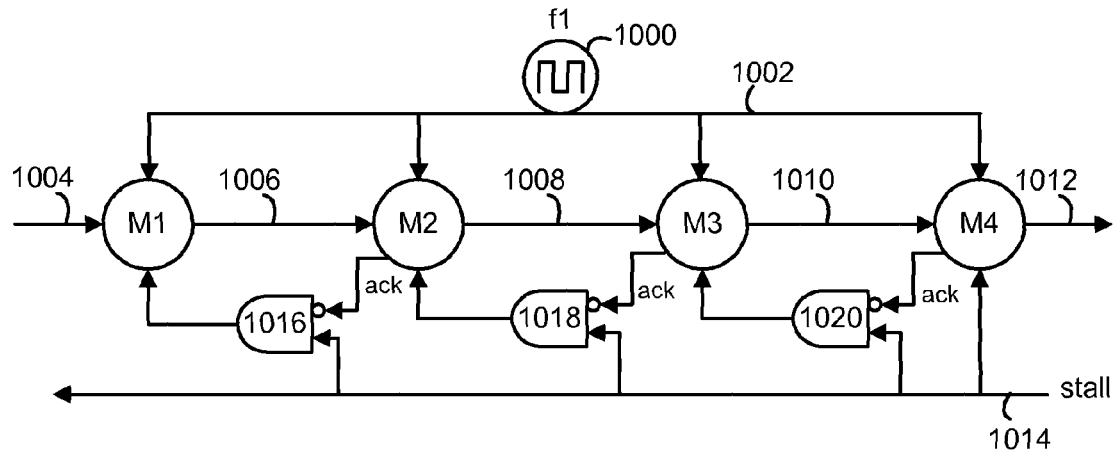
FIG. 10b depicts a synchronous pipeline with a stall signal and acknowledgement signals.

FIG. 10b depicts a synchronous pipeline with a stall signal and acknowledgement (ack) signals. The asynchronous ack signal (which is really the logical equivalent of the complement of the stall) can be the last arrival input for a module, so modeling it is important. For this purpose, we augment the synchronous circuit with "virtual" ack signals, going from consumers to producers. The negation of the virtual ack signal is logically ANDed with the actual stall signal. For example, the configuration of FIG. 10a is modified by providing AND components 1016, 1018 and 1020 which provide output signals to M1, M2 and M3, respectively. The output of the AND component 1016 is the negation of the ack signal of M2 ANDed with the stall signal, the output of the AND component 1018 is the negation of the ack signal of M3 ANDed with the stall signal, and the output of the AND component 1020 is the negation of the ack signal of M4 ANDed with the stall signal. M4 receives the stall signal directly. A component which provides an ack signal is the producer of the signal and a component that receives the ack signal is a consumer of that signal. The modules M1 through M4 are in different stages of a pipelined process in a common clock domain.

Figure 11:
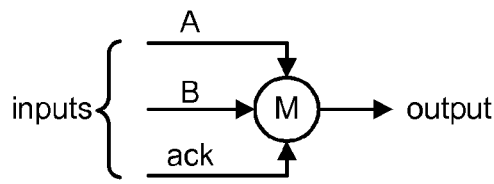
FIG. 11 depicts a hardware module which has multiple input control signals, including an acknowledgement signal.

In one implementation, if all the inputs of a module are available, we break ties by assuming that the virtual ack signal is the last arrival input. For example, FIG. 11 depicts a hardware module M which has multiple input control signals, including A, B and an ack signal as the selected last arrival input.

Figure 12:
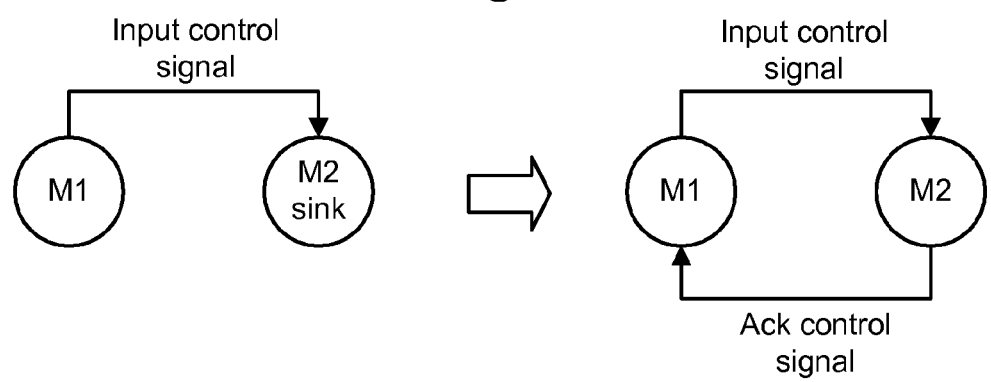
FIG. 12 depicts modeling a hardware component which is a pure sink to add an output acknowledgement signal.
Figure 13:
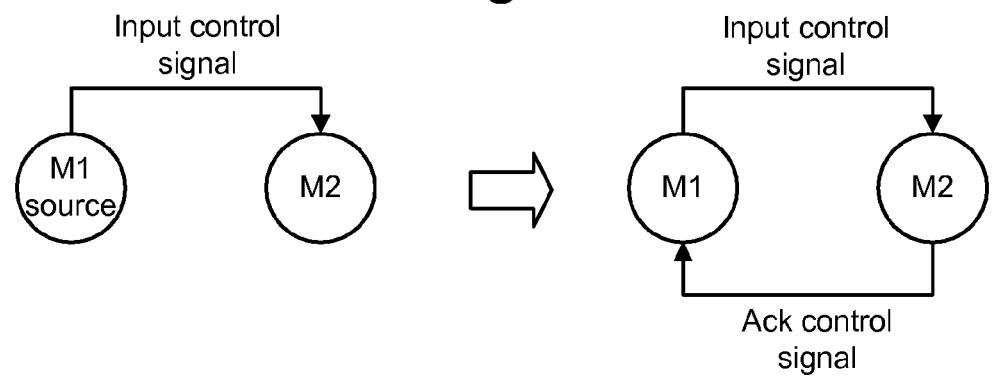
FIG. 13 depicts modeling a hardware component which is a pure source to add an input acknowledgement signal.

Regarding pure sources and sinks: Consider the register file in a simple pipelined processor (i.e., in the absence of register renaming). One control input to the register file is a write enable. This kind of register file never has a reason to stall a write request. Thus, in the circuit graph, it is a pure sink (there are only incoming control signals for the write port). A symmetric situation occurs with a pure source (e.g., a DMA module controlled by the Ethernet interface) such that there are only outgoing control signals. Computing the GCP requires the circuit graph to be strongly connected. Sinks that cannot stall can never be reached by going backwards over a control edge, so they can never be on the critical path. Sources can cause the path construction algorithm to get "stuck," since they have no in-edges. Adding virtual ack signals to pure sources and sinks solves this problem, making the graph strongly connected. For example, FIG. 12 depicts modeling a hardware component which is a pure sink to add an output ack signal, and FIG. 13 depicts modeling a hardware component which is a pure source to add an input ack signal.

Note that using the rule that the ack signal is the last arrival input when breaking ties means that, in fact, such a pure sink could become part of the critical path after this transformation. Having the sink on the critical path is an indication that the system is not bottlenecked by any resource limitation, and it runs at full speed.

Figure 14:
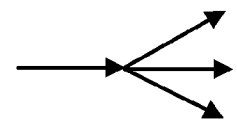
FIG. 14 depicts multiple fanned out copies of a control signal.

Regarding signals with fanout: A signal such as a pipeline stall has a large fanout. Such a signal should be treated as multiple independent point-to-point signals that happen to have the same value and transition at the same time. The reason is that the stall signal may be the last arrival input for some pipeline stages, but not for others. For example, FIG. 14 depicts multiple fanned out copies of a control signal.

Figure 15:
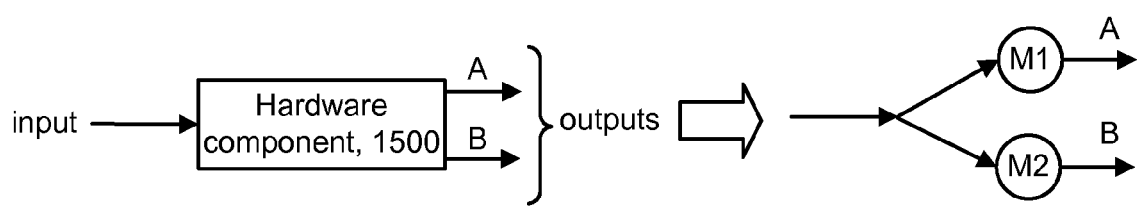
FIG. 15 depicts modeling a hardware component which has multiple outputs as separate hardware modules for each output.

Regarding modules with multiple outputs: If a module computes multiple outputs it should be treated by the GCP-building algorithm as multiple modules, each with a single output. The reason is that each output may have distinct dependencies. Examples include caches, which interface with both the pipeline and with the bus. For example, FIG. 15 depicts modeling a hardware component 1500 which has multiple outputs (e.g., outputs A and B) as separate hardware modules M for each output, e.g., a module M1 which has the output A, and a module M2 which has the output B.

Interestingly, the GCP provides greater insight when analyzing systems with a high degree of concurrency: these designs have complex interactions that are hard to understand. GCP is a very effective tool for diagnosing problems in MPSoCs composed of multiple concurrent IP blocks or cores, since the GCP diagnoses the actual delays that impact end-to-end performance.

One methodology for computing the GCP requires low-level instrumentation of all the control signals of all modules involved. It may not be possible to instrument internal control signals of third-party modules incorporated in SoCs because source code may be unavailable or encrypted. Additionally, modifying the modules to log critical signals, manually or automatically, often requires a thorough understanding of the module's behavior. A solution to this problem is to create an abstraction of the module instances and treat modules as black boxes. The designer needs to only identify the control signals in the module's interface. Based on the transitions of these signals, the GCP analysis provides hints about the module as a whole being on the system's critical path. Paths internal to the module are obfuscated from the GCP analysis. This solution reduces instrumentation effort and simultaneously allows the use of third-party netlists. We investigate whether the lack of knowledge of internal structure of a module can cause incorrect computations of the GCP.

Future work includes investigating whether the use of split-transactions in SoCs (which requires inter-chip protocols to use transaction tags in requests and responses), can be used to infer input-to-output control signal dependencies without requiring detailed models of module internals.

Next, we describe the system we used in our experiments. In order to keep our evaluation tractable, we started with a simple and well-understood system which models an SoC composed of up to six modules that can be independently optimized, each of them in a separate clock domain. Our system is built around GRLIB, the Gaisler Research IP Library that includes SoC components interacting with the LEON3 SPARC V8 processor, a 32-bit open-source synthesizable CPU. However, other implementations are possible.

LEON3 uses a single-issue, 7-stage pipeline: Fetch, Decode, Register Access, Execute, Memory, Exception and Writeback. The processor has separate instruction and data caches. The data cache follows a write-through, and no-write-allocate-on miss-policy. The LEON3 communicates with DRAM, and other IP cores devices via a shared AMBA system bus.

We modified the VHDL source code of the LEON3 design to log the transitions of control signals. The LEON3 processor was originally implemented using a single VHDL process, which required all stages of the pipeline to be updated simultaneously. In order to segregate the control signals at the granularity of pipeline stages, we split the process construct into seven VHDL processes, one per pipeline stage. This allowed us to track control signals that originated within the pipeline and affected other stages. Along the lines of the discussion above regarding GCP accuracy, we added request (req) and acknowledge (ack) signals between adjacent pipeline stages. These signals do not change the functionality of the pipeline. When a pipeline stage is ready to send data to the succeeding stage, it asserts the req signal (same as the write enable signal of the latch register). The ack signal is asserted when the following stage is ready to operate on the data. Overall, we annotated less than 0.2% of the signals in the SoC. Our annotated code increased the system's line count by 1%.

Figure 16:
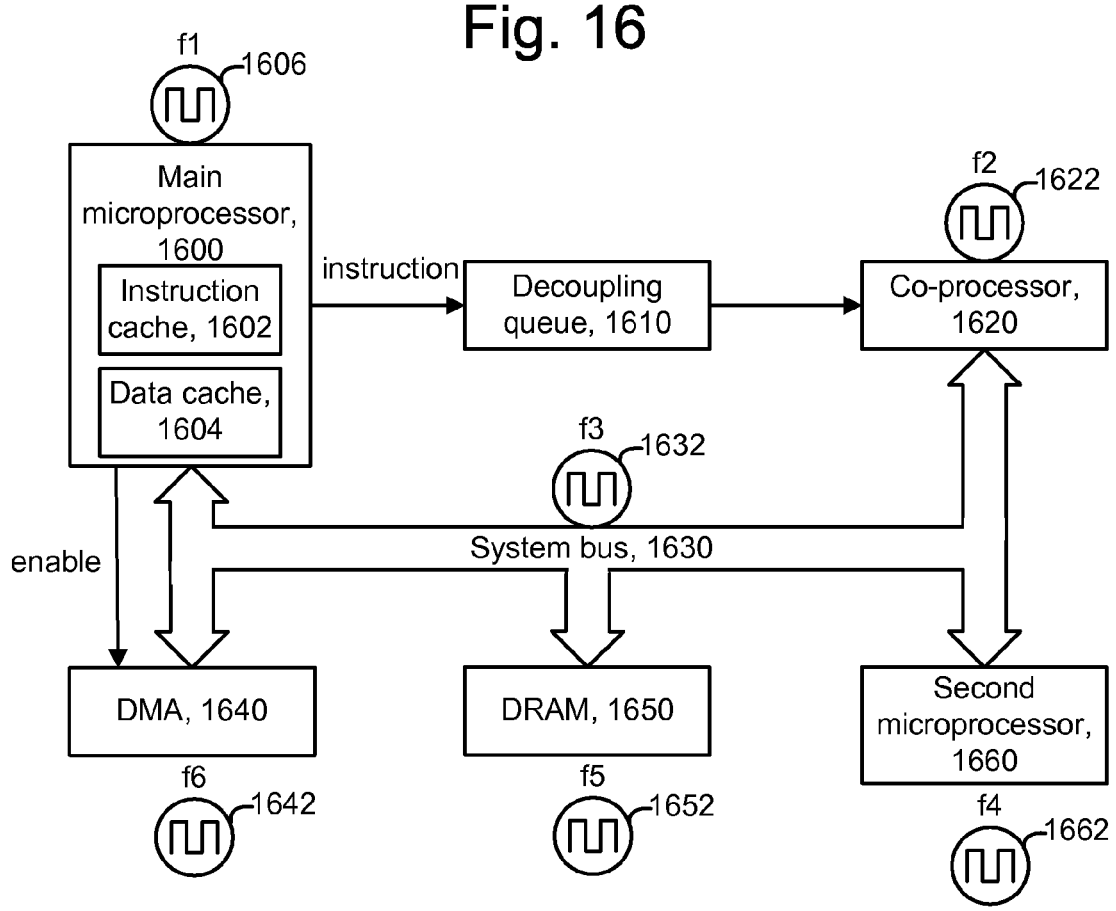
FIG. 16 depicts an example SoC which contains hardware components in multiple clock domains.

Our system under test was designed to mirror the composition of a contemporary small, embedded MPSoC. The system is composed of two processors, (one of which has an attached coprocessor), a DMA engine, a DRAM interface and a shared system bus. FIG. 16 shows a high-level overview of our example system architecture. The techniques provided herein are applicable to essentially any SoC design. Specifically, the SoC design provided herein includes a main microprocessor 1600, which includes an instruction cache 1602 and a data cache 1604. A decoupling queue 1610 receives instructions from the main microprocessor and provides them to a co-processor 1620. A second micro-processor 1660 is provided, in addition to a dynamic random access memory (DRAM) 1650 and a direct memory access (DMA) component 1640, which receives an enable signal from the main microprocessor 1600. A system bus 1630 allows the components 1600, 1620, 1640, 1650 and 1660 to communicate with one another. Further, different clocks, having different respective frequencies, are provided for some of the different components, including clocks 1606 (f1), 1622 (f2), 1632 (f3), 1642 (f6), 1652 (f5) and 1662 (f4). Thus, each of the components 1600, 1620, 1630, 1640, 1650 and 1660 is synchronous (clocked) in its respective clock domain, but the components are asynchronous with respect to one another.

The coprocessor 1620 is a four-stage pipeline that performs Dynamic Information Flow Tracking (DIFT) on the instruction stream executed by the main processor 1600, for security purposes. To explore the impact of a large configuration space, we added support for multiple clock domains (CD). Each component, including the bus, is in a separate CD—i.e., the frequency of each CD can be adjusted independently. This was accomplished by adding asynchronous queues (not shown) between the various modules and the system bus.

SoCs can contain third party IP blocks for which designers do not have access to source code. We emulate this case by treating in some cases the coprocessor and DMA engine as black boxes. We restrict logging control signal transitions for these IP blocks to just the interfaces they provide, thus reducing instrumentation effort, but potentially sacrificing fidelity.

We perform cycle-accurate behavioral simulation of the design's RTL using ModelSim 6.3 (Mentor Graphics, Inc, Wilsonville, Oreg.). Structural simulation of the system can be used as well; for this small design or other designs, it should produce identical results. Logging all control signals in our system did not increase the simulation time.

SoC designers impose design performance constraints that can be specified by cost functions such as power-delay, area-delay, etc. Cost functions typically include factors such as performance coupled with chip power, area, or other metrics. For the purposes of this evaluation, we define our cost function to be the power-delay product (PD), summed over all the components in the SoC:

$$PD = \text{Power} \times \text{Delay} = \Sigma(C_i V_i^2 f_i) \times (\text{Execution Time})$$

We discuss how alternative cost metrics can be accommodated. Here, C is the capacitance, V is the voltage and f the frequency of each system component i. We report normalized power-delay results with respect to the initial configuration. In all of our experiments, we execute a small synthetic benchmark on the processors. The main processor 1600 (FIG. 16) executes an integer benchmark, while the second processor 1660 executes an I/O benchmark. The two processors run concurrently, and compete with each other for resources, such as the shared system bus 1630. The coprocessor 1620 inspects the instruction stream committed by the main processor 1600, and checks for security flaws. While our benchmarks are small (hundreds of thousands of cycles), our methodology can be easily extrapolated to more complex workloads.

Figure 17:
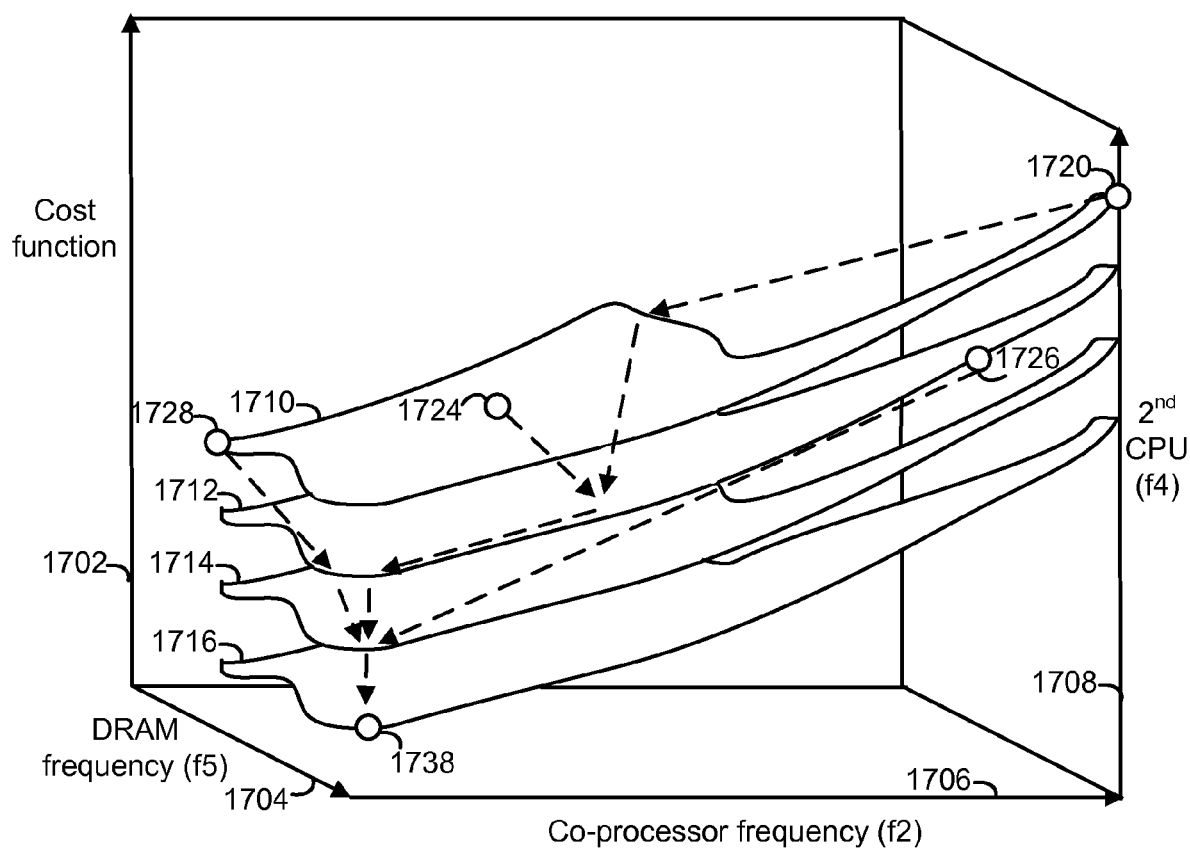
FIG. 17 depicts a search space for a four-module system.

In order to assess the effectiveness of the GCP method for quickly discovering high-quality configurations, we first performed an exhaustive search of the parameter space for three independent parameters: the clock frequencies of the second CPU 1660 (FIG. 16), the coprocessor 1620, and DRAM 1650. (The clock frequency of the main CPU 1600 is held constant; frequencies are changed in increments of 5 MHz). We constrain system performance to be above a minimum threshold; an execution longer than the threshold is unacceptable and not shown in the surfaces in FIG. 17. FIG. 17 depicts a search space for a four-module system. The four modules are taken from the SoC design of FIG. 16. The search space includes an axis 1702 for the cost function, which is the normalized power-delay, an axis 1704 for the DRAM frequency f5, an axis 1706 for the co-processor frequency f2 and an axis 1708 for the second microprocessor/CPU frequency f4. Further, four surfaces are shown, e.g., surfaces 1710, 1712, 1714 and 1716, which each correspond to different fixed value of f4. Note that the search space has three degrees of freedom; the number of modules is not as important.

Due to the constraints mentioned above, the search space has an irregular shape. The surfaces in FIG. 17 show the Power-Delay (PD) values for all possible legal combinations. Color coding has been removed for clarity, but color coding reveals that the upper right hand surface portions have a high PD (bad) and the lower left hand surface portions have a low PD (good), and lower on the graph is better.

Example points in the search space are represented by circles, and the arrows show the directed search followed by using the GCP from four initial points, chosen randomly or otherwise. The four initial points are represented by circles 1720, 1724, 1726 and 1728. The circle 1738 represents the final, convergence point. The values of f2, f4 and f5 which correspond to that point are used in SoC design to achieve the corresponding optimally minimized cost-function. The search proceeds by choosing one or both of two kinds of moves: (1) increase system performance, by speeding up a module on the critical path, or (2) decrease system power, by slowing down a module outside of the critical path. Note that, while we modify clock frequencies of components in these experiments, we could choose other moves which impact the cost function, such as changes in capacitance, voltage, even arbiter priorities and cache sizes.

Computing these results required a large number of simulations (more than 130) even when exploring just three degrees of freedom. We used the exhaustive search as the ground truth for finding the optimal. The GCP-based directed search requires significantly fewer number of simulation points in the search space while improving the optimization criterion, PD. This directed search is completely automatic, and does not require any human intervention. The directed search converges very rapidly when the optimization algorithm makes monotonic moves in the cost function space. The critical path algorithm ranks the components or modules in terms of criticality thereby enabling monotonic moves. The most critical component or module is sped up. In the case of a tie, a critical module is chosen at random, and sped up. The least critical components or modules are slowed down, to ensure that the system does not exceed the operating budget. If a move results in an increase in the cost function, then the search algorithm discards the move, backs up to the previous valid state, and makes an alternate move. Valid moves result in a decrease in execution time, thus ensuring that moves in the cost function space are monotonic. The search algorithm converges when it is unable to find a configuration that further decreases the cost function.

The arrows in FIG. 17 show the results of this directed search overlaid on the exhaustive search space. We show four searches, starting from four random points, which rapidly converge to the optimal configuration. In our experiments, the longest search took only five simulation steps. The data is as follows: [Coprocessor Frequency f2] [DRAM Frequency f5] [Cost Function: PD]=[50 50 55 55 55], [95 120 120 120 120], [628 593 567 520 482] for the search starting at the point represented by circle 1724; [55 55 55 55], [75 115 120 120], [623 563 520 482] for the search starting at the point represented by circle 1728; [40 55 55], [75 120 120], [640 520 482] for the search starting at the point represented by circle 1726; and [40 45 50 55 55 55], [110 80 120 120 120 120], [755 678 593 567 520 482] for the search starting at the point represented by circle 1720. The cost function data here is not normalized.

These results are applicable for other optimization functions that combine system performance (delay) with other metrics (e.g., area, design time, reliability, etc). The algorithm requires a set of parameters that can be changed for each module, and knowledge of their impact on the optimization metrics. The current algorithm always improves the performance of modules on the critical path, and decreases the cost of modules outside of the path. More sophisticated algorithms can be formulated and used in this framework.

While it may be possible to perform an exhaustive search of all the allowable configurations for a small number of components, this approach quickly becomes intractable for a larger number of modules. By making all six hardware modules in our system configurable (ten possible configurations for the main CPU, four for the DMA engine, and three for the system bus), the size of the search space grows from 160 to 19200. For such a large space, we cannot exhaustively compute the optimal configuration. This issue is even more acute for real systems, which can have tens or hundreds of degrees of freedom.

Figure 18:
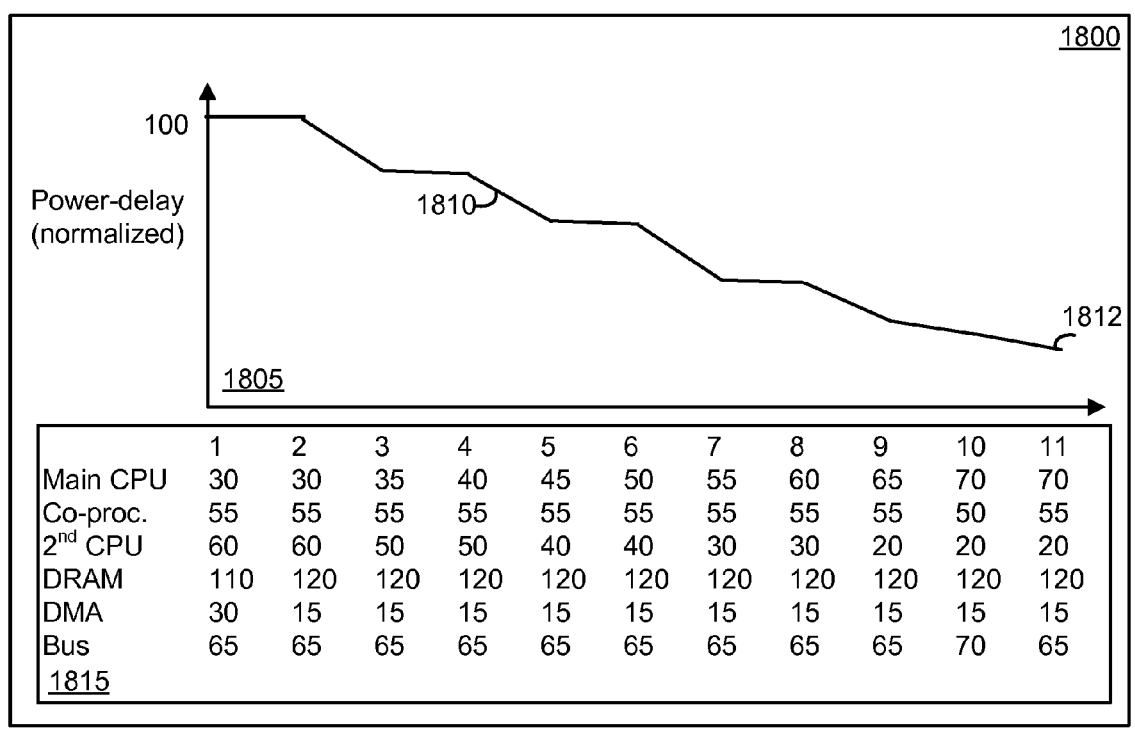
FIG. 18 depicts search results from a directed search in a six-dimensional space, for the example SoC of FIG. 16.

In FIG. 18, we show the results of the directed search for the large search space, which converges to a minimal PD configuration in just eleven steps. Specifically, FIG. 18 depicts search results from a directed search in a six-dimensional space, for the example SoC of FIG. 16. Note that the data in this example does not correspond to that of FIG. 17. The search results are provided in a report 1800, which includes a graphical region 1805 and a tabular region 1815. The graphical region 1805 provides an x-y plot in which a cost function of normalized power-delay (normalized to start at 100)) is on the y-axis and the number of iterations (from one to eleven) of the optimization process is on the y-axis. The cost function indicated is the lowest among the searches. The curve 1810 depicts the level of the power-delay, while point 1812 depicts the convergence point, in which the slope of the curve becomes small, within a specified tolerance. Further, note that the curve 1810 is aligned with the columns in the tabular region 1815.

The tabular region identifies the six hardware modules which are optimized, namely the main CPU, co-processor, second CPU, DRAM, DMA component and bus. The values in the table represent units of MHz. The initial configuration, in iteration 1, depicts frequencies of 30, 55, 60, 110, 30 and 65 MHz. In the second iteration, the DRAM frequency is increased (representing speeding the component up) from 110 to 120 MHz, and the DMA frequency is decreased (representing slowing the component down) from 30 to 15 MHz. In the third iteration, the main CPU frequency is increased from 30 to 35 MHz. In the fourth iteration, the main CPU frequency is increased from 35 to 40 MHz. In the fifth iteration, the main CPU frequency is increased from 40 to 45 MHz, and the second CPU frequency is decreased from 50 to 40 MHz. In the sixth iteration, the main CPU frequency is increased from 45 to 50 MHz. In the seventh iteration, the main CPU frequency is increased from 50 to 55 MHz, and the second CPU frequency is decreased from 40 to 30 MHz. In the eight iteration, the main CPU frequency is increased from 55 to 60 MHz. In the ninth iteration, the main CPU frequency is increased from 60 to 65 MHz, and the second CPU frequency is decreased from 30 to 20 MHz. In the tenth iteration, the main CPU frequency is increased from 65 to 70 MHz, the co-processor frequency is decreased from 55 to 50 MHz, and the bus frequency is increased from 65 to 70 MHz. In the eleventh iteration, the co-processor frequency is increased from 50 to 55 MHz, and the bus frequency is decreased from 70 to 65 MHz.

It is possible to abstract away module information. Using our SoC infrastructure, we obtained the critical path when the main CPU was treated as a black box, and compared it with the path obtained with knowledge of the internal CPU structure. We found that both analyses ranked the same edges in the histogram to be critical. There was a slight difference of 3% in the number of transitions seen between the abstracted and non-abstracted case.

On further investigation, we found that this difference was due to the non-blocking stores issued by the main processor that hit in its data cache. LEON3 has a write-through data cache that follows a no-allocate-on-miss policy. All stores must be written to main memory in order to maintain consistency. With an abstracted view, we merely see all memory requests from the processor, but not the context they are issued under. Thus, even though the processor does not stall (waiting for DRAM to reply for such stores), the GCP algorithm places these stores on the critical path (in other words, we are missing some of the dependencies between inputs and outputs for the black-box module). In the non-abstracted view, these stores are not considered critical because the processor does not stall. The difference in the critical path is proportional to the percentage of non-blocking requests. Modules that have few non-blocking requests, or that allow the algorithm to infer the dependent input-output pairs will provide accurate critical path results in the abstracted view. A blocking request requires a component/module to be in an idle state while waiting for information, while a non-blocking request allows the component to work on something else while it is waiting.

Thus, even when approximated, the critical path analysis can still provide useful hints for optimizing systems with black-box IP blocks. This is a viable technique, depending both on the design's characteristics, and the designer's tolerance to loss of fidelity. This shows promise for abstracting low-level detail in IP blocks resulting in less logging overhead, and closed-source IP block compatibility.

The case for using dynamic global critical path analysis for diagnosing and optimizing performance problems in SoC and MPSoC systems where the designer may not understand complex system interactions has been demonstrated. Using publicly available IP blocks, an MPSoC was optimized for power-delay using the GCP framework. The model MPSoC included GALS components. A directed search algorithm based on the GCP provided optimal configurations in a few steps (11 out of 19200 possibilities). This method was successfully applied to SoC designs with 3-6 degrees of freedom. However, the GCP can be applied to larger SoC and MPSoC systems with many more degrees of freedom.

Our initial implementation required knowledge of the system in order to instrument the source code. We instrumented less than 0.2% of the module signals or about 1% more lines of instrumentation code and added immeasurable overhead to the simulation time. However, we also demonstrated that abstracted modules (black-box IP blocks) with user-supplied context can provide close approximations to the GCP. By abstracting RTL modules, the absolute difference of the GCP analysis was only 3% different compared to complete GCP using the low-level GCP analysis. The overall GCP ranking of module criticality was unchanged using the abstracted or black-box RTL modules and the PD optimal design search results were the same.

Alternative approaches may automatically infer control signals from the HDL and generate the resulting instrumentation code to reduce designer effort. Accurate abstract SoC models may also be generated to speed up simulation for real, commercial MPSoCs or SoCs.

The above-described procedure for optimizing the design of a system-on-a chip may use computer hardware such as a laptop or desktop computer, an example of which is described below. Furthermore, the SoC design may be modeled entirely in software, or may interface with actual hardware components as well.

Figure 19:
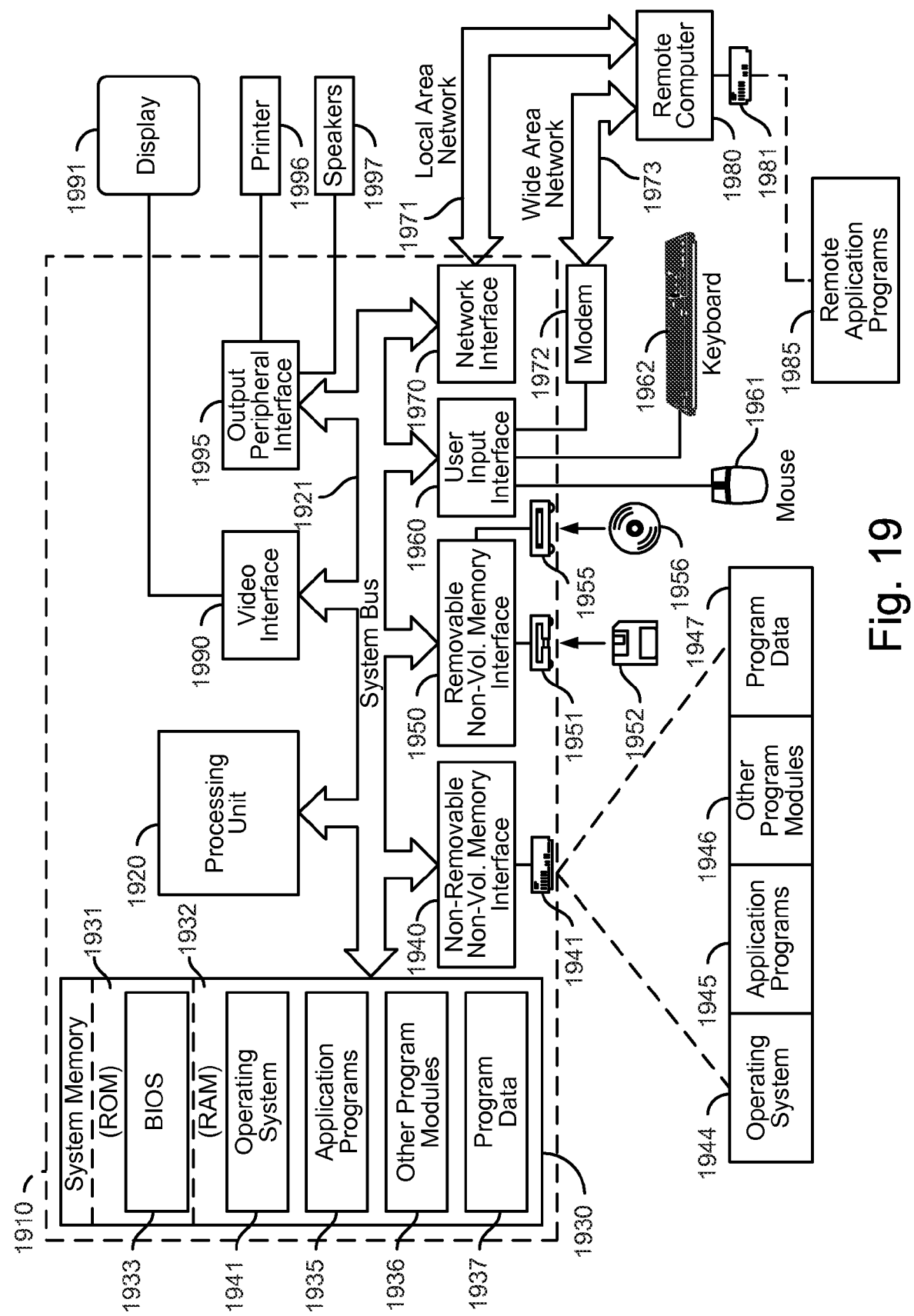
FIG. 19 is a block diagram of computer hardware suitable for implementing embodiments of the invention.

FIG. 19 is a block diagram of computer hardware suitable for implementing embodiments of the invention. An exemplary system for implementing the invention includes a general purpose computing device in the form of a computer 1910. The computer 1910 may represent a server which provides a user interface, estimate contest, prediction market, and/or scoring rules, for instance. Components of computer 1910 may include, but are not limited to, a processing unit 1920, a system memory 1930, and a system bus 1921 that couples various system components including the system memory to the processing unit 1920. The system bus 1921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1910 typically includes a variety of computer readable media. Computer readable media can be any available media that can be accessed by computer 1910 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1910. By way of example, and not limitation, communication media includes wired media such as a wired network or direct-wired connection, and wireless media such as acoustic, RF, infrared and other wireless media. Combinations of any of the above are also included within the scope of computer readable media.

The system memory 1930 includes computer storage media in the form of volatile and/or nonvolatile memory such as read only memory (ROM) 1931 and random access memory (RAM) 1932. A basic input/output system 1933 (BIOS), containing the basic routines that help to transfer information between elements within computer 1910, such as during start-up, is typically stored in ROM 1931. RAM 1932 typically contains data and/or program modules that are immediately accessible to and/or presently being operated on by processing unit 1920. By way of example, and not limitation, FIG. 19 illustrates operating system 1934, application programs 1935, other program modules 1936, and program data 1937.

The computer 1910 may also include other removable/non-removable, volatile/nonvolatile computer storage media. By way of example only, FIG. 19 illustrates a hard disk drive 1941 that reads from or writes to non-removable, nonvolatile magnetic media, a magnetic disk drive 1951 that reads from or writes to a removable, nonvolatile magnetic disk 1952, and an optical disk drive 1955 that reads from or writes to a removable, nonvolatile optical disk 1956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1941 is typically connected to the system bus 1921 through a non-removable memory interface such as interface 1940, and magnetic disk drive 1951 and optical disk drive 1955 are typically connected to the system bus 1921 by a removable memory interface, such as interface 1950.

The drives and their associated computer storage media discussed above and illustrated in FIG. 19, provide storage of computer readable instructions, data structures, program modules and other data for the computer 1910. For example, hard disk drive 1941 is illustrated as storing operating system 1944, application programs 1945, other program modules 1946, and program data 1947. These components can either be the same as or different from operating system 1934, application programs 1935, other program modules 1936, and program data 1937. Operating system 1944, application programs 1945, other program modules 1946, and program data 1947 are given different numbers here to illustrate that, at a minimum, they are different copies. A user may enter commands and information into the computer 1910 through input devices such as a keyboard 1962 and pointing device 1961, commonly referred to as a mouse, trackball or touch pad. Other input devices (not shown) may include a microphone, joystick, game pad, satellite dish, scanner, or the like. These and other input devices are often connected to the processing unit 1920 through a user input interface 1960 that is coupled to the system bus, but may be connected by other interface and bus structures, such as a parallel port, game port or a universal serial bus (USB). A monitor 1991 or other type of display device is also connected to the system bus 1921 via an interface, such as a video interface 1990. In addition to the monitor, computers may also include other peripheral output devices such as speakers 1997 and printer 1996, which may be connected through an output peripheral interface 1995.

The computer 1910 may operate in a networked environment using logical connections to one or more remote computers, such as a remote computer 1980. The remote computer 1980 may be a personal computer, a server, a router, a network PC, a peer device or other common network node, and typically includes many or all of the elements described above relative to the computer 1910, although only a memory storage device 1981 has been illustrated. The logical connections depicted include a local area network (LAN) 1971 and a wide area network (WAN) 1973, but may also include other networks. Such networking environments are commonplace in offices, enterprise-wide computer networks, intranets and the Internet.

When used in a LAN networking environment, the computer 1910 is connected to the LAN 1971 through a network interface or adapter 1970. When used in a WAN networking environment, the computer 1910 typically includes a modem 1972 or other means for establishing communications over the WAN 1973, such as the Internet. The modem 1972, which may be internal or external, may be connected to the system bus 1921 via the user input interface 1960, or other appropriate mechanism. In a networked environment, program modules depicted relative to the computer 1910, or portions thereof, may be stored in the remote memory storage device. By way of example, and not limitation, FIG. 19 illustrates remote application programs 1985 as residing on memory device 1981. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer-implemented method for optimizing a system-on-a-chip (SoC) design, comprising:
   using a computer: determining a global critical path of the SoC design for an initial configuration of multiple hardware modules of the SoC design, the multiple hardware modules include respective hardware modules, which are synchronous in respective different clock domains and asynchronous with respect to one another, a subset of the multiple hardware modules are identified as being in the global critical path;
   the determining the global critical path comprises tracking transitions of control signals, which are input to and output from each of the multiple hardware modules, and determining dependencies between the control signals;
   modifying a configuration of the hardware modules in each of one or more successive iterations, and determining a cost function for each modified configuration;
   determining which of the modified configurations is optimal based on the cost functions; and
   providing a report which identifies the optimal configuration.

2. The computer-implemented method of claim 1, further comprising:
   criticality ranking the hardware modules, the modifying is based on the ranking.

3. The computer-implemented method of claim 2, wherein:
   the modifying comprises at least one of: (a) increasing a processing speed of a hardware module with a relatively high criticality, and (b) decreasing a processing speed of a hardware module with a relatively low criticality.

4. The computer-implemented method of claim 1, wherein:
   the modifying comprises at least one of: (a) increasing a processing speed of a hardware module which is in the global critical path, and (b) decreasing a processing speed of a hardware module which is not in the global critical path.

5. The computer-implemented method of claim 1, wherein:
   the modifying comprises at least one of: (a) adding at least one hardware module in the global critical path, and (b) removing at least one hardware module which is not in the global critical path.

6. The computer-implemented method of claim 1, wherein:
   the tracking transitions comprises attributing an output control signal transition of each of the multiple hardware modules to an associated input control signal transition; and
   when a particular output control signal transition depends on multiple input control signal transitions, the particular output control signal transition is attributed to a last arrival of the multiple input control signal transitions.

7. The computer-implemented method of claim 1, wherein:
   the tracking transitions comprises attributing an output control signal transition of each of the multiple hardware modules to an associated input control signal transition; and
   when a particular output control signal transition depends on multiple concurrent input control signal transitions, the particular output control signal transition is attributed to a randomly selected one of the multiple input control signal transitions.

8. The computer-implemented method of claim 1, wherein:
   the tracking transitions comprises attributing an output control signal transition of each of the multiple hardware modules to an associated input control signal transition; and
   when a particular output control signal transition depends on multiple concurrent input control signal transitions, the particular output control signal transition is attributed to one of the multiple input control signal transitions based on a round robin selection process.

9. The computer-implemented method of claim 1, wherein:
   the tracking transitions comprises attributing an output control signal transition of each of the multiple hardware modules to an associated input control signal transition; and
   when a particular output control signal transition depends on multiple concurrent input control signal transitions, the particular output control signal transition is attributed to whichever of the multiple input control signal transitions is last to stabilize.

10. The computer-implemented method of claim 1, wherein:
   the determining dependencies between the control signals comprises starting at a last output control signal transition of the multiple hardware modules, and working backward recursively to identify a chain of control signal transitions which reaches a start state, the chain represents the global critical path.

11. The computer-implemented method of claim 1, wherein:
in the SoC design, each of multiple control signal outputs of a single hardware component is represented by a different hardware module, each different hardware module have a single control signal output.

12. The computer-implemented method of claim 1, wherein:
the tracking transitions of control signals includes independently tracking transitions of fanned out copies of a given control signal.

13. The computer-implemented method of claim 1, wherein:
the tracking transitions is performed using a hardware description language which represents one of the hardware modules which is a main central processing unit of the SoC design.

14. A computer-implemented method for optimizing a system-on-a-chip (SoC) design, comprising:
using a computer: determining a global critical path of multiple hardware modules of the SoC design, the multiple hardware modules include respective hardware modules which are synchronous in respective different clock domains and asynchronous with respect to one another, a subset of the multiple hardware modules are identified as being in the global critical path;
the determining the global critical path comprises tracking transitions of control signals, which are input to and output from each of the multiple hardware modules, and determining dependencies between the control signals;
at least one of the hardware modules outputs an acknowledgement control signal to another hardware module in response to receipt of an input control signal from the another hardware module, the at least one of the hardware modules and the another hardware module are in different stages of a pipelined process in a common clock domain, the tracking includes tracking transitions of the acknowledgement control signal;
determining a processing time of each hardware module based on the tracking;
determining a cost function based on the processing time;
determining an optimal configuration for each hardware module based on the cost function; and
providing a report which identifies the optimal configuration.

15. The computer-implemented method of claim 14, wherein:
the at least one of the hardware modules represents a hardware component, which is a pure sink in the SoC design, and a representation of the hardware component, which is the pure sink is configured to provide the control signal which is received by the at least one of the hardware modules.

16. The computer-implemented method of claim 14, wherein:
the another hardware module represents a hardware component, which is a pure source in the SoC design, and a representation of the at least one of the hardware modules is configured to receive the control signal from the another hardware module.

17. The computer-implemented method of claim 14, wherein:
the tracking transitions comprises attributing an output control signal transition of each hardware module to an input control signal transition; and
when a particular output control signal transition of the another hardware module depends on multiple concurrent input control signal transitions, including a transition in the acknowledgement control signal, the particular output control signal transition is attributed to the acknowledgement control signal.

18. Computer readable storage device having computer readable software embodied thereon for programming at least one processor to perform a method, the method comprising:
determining a global critical path of a system-on-a-chip (SoC) design, the SoC design having respective hardware modules, which are synchronous in respective clock domains and are asynchronous with respect to one another, a first subset of the multiple hardware modules are identified as being in the global critical path, and a remainder of the multiple hardware modules are not in the global critical path;
the determining the global critical path comprises tracking transitions of control signals, which are input to and output from each hardware module, determining dependencies between the control signals, and determining a processing time of each hardware module;
determining a cost function based on the processing time of each hardware module;
determining an optimal configuration for the SoC design by determining a configuration of the hardware modules which optimizes the cost function; and
providing a report, which identifies the optimal configuration.

19. The computer readable storage device of claim 18, wherein:
the tracking transitions is performed using a hardware description language which represents one of the hardware modules which is a main central processing unit of the SoC design.

20. The computer readable storage device of claim 18, wherein:
the determining the optimal configuration comprises at least one of: (a) increasing a processing speed of a hardware module which is in the global critical path, and (b) decreasing a processing speed of a hardware module which is not in the global critical path.

* * * * *